3,799,867
REFORMING WITH PLATINUM AND TANTALUM OR NIOBIUM CATALYST

Joseph Robin Cardwell, Ashford, and Christopher Ronald Pout, Feltham, England, assignors to The British Petroleum Company Limited, London, England
No Drawing. Filed Nov. 3, 1971, Ser. No. 195,442
Claims priority, application Great Britain, Nov. 25, 1970, 55,983/70
Int. Cl. C10g 35/06; B01j 11/78, 11/12
U.S. Cl. 208—139
2 Claims

ABSTRACT OF THE DISCLOSURE

A catalyst of 0.01–5% Pt on a refractory support, contains also 0.01–5% wt. of Ta or Nb. The support is preferably alumina which may contain halogen. The Ta or Nb may be added at any convenient stage in the catalyst preparation, including adding it as a chloride or fluoride during the preparation of the support.

The Pt-Ta or Pt-Nb catalysts may be used for hydrocarbon conversion, particularly reforming isomerization, hydrocracking, and hydrogenation.

---

This invention relates to catalysts containing a platinum group metal (i.e. platinum, palladium, ruthenium, rhodium, osmium or iridium) and their use for the catalytic conversion of hydrocarbons.

Catalysts of a platinum group metal, particularly platinum or palladium, on a refractory support are well known. The metal, which may be present in an amount of 0.01 to 5% wt., has good activity for hydrogenation or dehydrogenation and dehydrocyclization depending on the process conditions. By a suitable choice of support, additional functions of e.g. isomerization and cracking can be given to the catalyst.

Since platinum group metals are expensive, methods of reducing the metal content of such catalysts without adversely affecting their performance are potentially useful. Similarly, methods of improving the catalyst performance for a given quantity of platinum group metal are also useful. It has now been found that the presence of tantalum or niobium on a supported platinum group metal catalyst gives beneficial results.

According to one aspect of the present invention therefore a catalyst suitable for the conversion of hydrocarbons comprising from 0.01 to 5% wt. of a platinum group metal on a refractory support is characterized in that it contains also from 0.01 to 5% wt. of tantalum or niobium.

Preferably the amounts of the platinum group metal and the tantalum or niobium are each within the range 0.1 to 1% wt. The preferred platinum group metals are palladium and, particularly, platinum. The choice of tantalum or niobium depends on the particular reaction or reactions desired, as discussed in more detail hereafter.

The refractory support is preferably an inorganic oxide of an element of Group II, III, IV of the Periodic Table, a mixture of two or more such oxides or a compound containing one or more of such oxides in its empirical formula. Preferred individual oxides are silica or alumina; preferred mixed oxides are silica-alumina, silica-magnesia, or boria-alumina, and preferred minerals are aluminosilicates e.g. zeolites. The catalysts may also contain from 0.1 to 15% wt. of halogen, particularly chlorine or fluorine.

The choice of support will depend on the intended use of the catalyst. Supports which are relatively inert, suitable for example for certain hydrogenation reactions, are silica and, particularly, alumina. Supports of moderate acidity suitable for example for catalytic reforming, are aluminas with 0.1 to 2% of halogen, particularly chlorine. Supports of high acidity suitable for isomerization, hydrocracking and certain hydrogenation reactions are aluminas with 2–15% wt. halogen, particularly fluorine or silica-aluminas having from 90–10% wt. alumina and 10–90% wt. silica.

According to another aspect of the invention a method of preparing a catalyst suitable for the conversion of hydrocarbons comprises forming a refractory oxide support and simultaneously or subsequently adding a tantalum or niobium compound in an amount of from 0.01 to 5% wt. of said metal and a platinum group metal compound in an amount of from 0.01 to 5% wt. of said metal.

The tantalum or niobium compound may be added during the formation of the refractory support. Thus it may be added to a solution which forms the precursor of a refractory oxide support and the precursor material may then be hydrolyzed to a hydrosol or hydrogel and subsequently dried and calcined. Alternatively the compound may be added to an already formed hydrosol or hydrogel which is then dried and calcined. The compound may also be added to the refractory oxide support itself, for example by impregnating it with a solution of the compound.

The tantalum or niobium compound may, if added during the formation of the support, be added as a solid, for example finely divided metal oxide. Preferably, however the method of addition, it is added as a solution of a salt, particularly a fluoride or chloride. The solutions may need to contain excess acid to prevent hydrolysis and convenient methods of preparation are to add the metal oxide to HF or to add the metal chloride to HCl. Concentrated acids are preferred.

Catalysts prepared from the halides, particularly fluoride, are likely to contain considerable amounts of halogen. However, where a high-acidity support is required this is not disadvantageous. If less acidic supports are required the halide may be at least partially removed by washing with water.

The platinum group metal compound may be added simultaneously with the tantalum or niobium compound during the formation of the support or the support may be co-impregnated with solutions of the compounds. Preferably it is added as the final component of the catalyst by impregnation of the support, already containing the tantalum or niobium compound, with any of the known solutions containing platinum group metal ions currently used in the preparation of platinum containing catalysts.

The catalyst containing the two metallic components may be dried as necessary e.g. at 50 to 150° C. for 1 to 24 hours and then calcined at 250 to 600° C. for 1 to 24 hours.

Desirably the catalysts are also reduced before use by heating them in a reducing atmosphere at 200 to 550° C. for 1 to 24 hours. The reducing atmosphere is preferably a flowing stream of hydrogen. The conditions necessary for the reduction of the dual-metal catalyst may be different from those of catalysts containing only platinum and care should be exercised in the reduction. The extent of reduction can be monitored by hydrogen uptake from a closed system in which hydrogen is circulated over the catalyst.

The present invention includes a process for the catalytic conversion of hydrocarbons comprising contacting the hydrocarbons under conversion conditions with a catalyst containing a platinum group metal and tantalum or niobium on a refractory support having a composition as previously described or prepared as previously described.

The preferred hydrocarbon feedstocks may be derived from any convenient source e.g. from petroleum and their precise nature will depend on the reaction required. In general they are likely to have from 3–40 carbon atoms.

Hydrocarbon conversion reactions known to be catalyzed by catalysts containing a platinum group metal include dehydrogenation, dehydrocyclization, hydrocracking, isomerization, and hydrogenation. These may be operated under the following broad ranges Temperature ° C. 100–600
Pressure bars gauge 1–210
Space velocity v./v./hr 0.1–10
$H_2$:hydrocarbon mole ratio 0–20:1

Thus for dehydrogenation and dehydrocyclization the feedstocks are preferably $C_5$–$C_{11}$ paraffins and/or olefins and/or naphthenes particularly petroleum fractions boiling in the gasoline range (15–204° C.) which may be converted at 300–600° C., 1–70 bars (ga.), 0.1–5 v./v./hr. and 0–20:1 $H_2$/hydrocarbon ratio.

The most common reaction of this type is the catalytic reforming of petroleum fractions boiling in the range 15–204° C. to increase octane number and/or aromatic content. Hydrocracking and isomerization may be subsidiary reactions in this process. Preferred operating conditions are 400–550° C., 3–35 bars (ga.), 0.5–5 v./v./hr. and 1:1–10:1 $H_2$/hydrocarbon mole ratio. As indicated earlier, reforming catalysts preferably use supports of low to moderate acidity, particularly alumina with possibly 0.1–2 wt. of halogen, particularly chlorine.

For hydrocracking the feedstocks may be $C_5$–$C_{40}$ hydrocarbons which may be paraffins, olefins, alkyl naphthenes or alkyl aromatics, particularly petroleum fractions boiling in the gasoline (15–204° C.) gas oil (150–370° C.) or wax distillate (370–600° C.) ranges. The preferred conditions are 300–600° C., 70–210 bars (ga.), 0.2–10 v./v./hr. and 2:1 to 20:1 $H_2$/hydrocarbon mole ratio.

For isomerization the feedstock may be $C_4$–$C_{11}$ hydrocarbons which may be paraffins, olefins, alkyl naphthenes or alkyl aromatics, particularly petroleum fractions boiling in the gasoline range (15–204° C.). The preferred conditions are 200–450° C., 1–70 bars (ga.), 0.5–10 v./v./hr. and 1:1–10:1 $H_2$/hydrocarbon mole ratio.

For hydrocracking and isomerization the catalyst support preferably has, as indicated earlier a relatively high acidity being, preferably, alumina with 2–15% wt. halogen, particularly fluorine or a silica-alumina with 90–10% wt. $Al_2O_3$ and 10–90% wt. $SiO_2$.

For hydrogenation the feedstocks may be $C_3$–$C_{40}$ unsaturated hydrocarbons, either cyclic or acyclic, particularly aromatics or olefins. Preferred feedstocks are petroleum fractions boiling in the gasoline (15–204° C.) or kerosine (150–250° C.) ranges which may be treated to hydrogenate their aromatic content to naphthenes without significant conversion of the other components. These feedstocks normally contain from 2–25% wt. aromatics, the remainder being saturated hydrocarbons.

The hydrogenation process conditions may be:

Temperature—50–400° C., preferably 100–350.
Pressure—7–210 bars gauge, preferably 15–150.
Space velocity—0.1–10 v./v./hr., preferably 0.5–5.
$H_2$:hydrocarbon mole ratio—0.1:1–20:1, preferably 1:1–10:1.

The catalyst support may be of low, moderate or high acidity, as discussed earlier. Theoretically in hydrogenation the support plays no active part, merely serving to form an extended surface for the hydrogenating metal and a low acid support for example silica, alumina or sepiolite would be adequate. Where the feedstock contains olefins, for example thermal or catalytically cracked gasolines such supports are in fact preferred to minimize side reactions such as polymerizations. Where the feedstock contains aromatics and the other components, if any, are saturated hydrocarbons an acidic support is, however, preferred. It is assumed that the acid support adsorbs the aromatics and holds them so that they can be hydrogenated under process conditions which are below the threshold for hydrocracking, isomerization and other reactions catalyzed by these acid supports. The preferred supports are thus the high acidity supports described above for hydrocracking and isomerization and the preferred process conditions are the preferred conditions given above for hydrogenation.

The invention is illustrated by the following examples.

EXAMPLE 1

Preparation of catalysts (a) 52 g. of aluminium foil were dissolved in 1000 cm.³ of 50% hydrochloric acid. A solution containing 0.32 g. of tantalum oxide ($Ta_2O_5$) dissolved in 20 cm.³ of 23 N hydrofluoric acid was then added, and the combined solutions stirred thoroughly. The combined solution was hydrolyzed by adding, dropwise, 500 cm.³ of 0.88 SG ammonia over a period of 4 hours. A further 300 cm.³ of deionized water were added and the hydrogel formed was stirred for 1 hour. The slurry was then filtered. The filter cake was washed into a flask with 500 cm.³ deionized water, stirred for one hour and refiltered. This washing procedure was repeated five times, to reduce the halogen content of the filter cake.

The filter cake was dried at 120° C. overnight, pelleted, granulated to 8–16 mesh BSS granules and calcined at 550° C. for 2 hours.

80 g. of the granules were added to 100 cm.³ of deionized water and then 0.84 g. of chlorplatinic acid were added to the water. The granules were allowed to stand overnight in contact with the chlorplatinic acid solution, then dried at 120° C. for 12 hours and calcined at 550° C. for 2 hours.

The catalyst contained 0.37% wt. platinum, 0.24% wt. tantalum, 5.6% wt. fluorine, and 0.15% wt. chlorine.

(b) A platinum-niobium-alumina catalyst was prepared in the same way the only differences being that 50 g. of aluminium foil were used as starting material, 0.33 g. of niobium oxide ($Nb_2O_5$) in HF were added instead of the tantalum solution, and 86 g. of the granules were impregnated with 0.89 g. of chlorplatinic acid.

The catalyst contained 0.34% wt. Pt, 0.25% wt. Nb, 11.0% wt. F and 0.05% wt. Cl.

(c) A platinum-niobium-alumina catalyst free of fluorine was prepared as for (b) above except that the niobium was added by means of a solution of 0.74 g. of niobium pentachloride in 15 ml. of concentrated HCl.

The catalyst contained 0.35% wt. Pt, 0.2% wt. Nb and 1% wt. Cl.

(d) A platinum-tantalum-alumina catalyst free of fluorine was prepared as for (b) above except that the tantalum was added by means of a solution of 0.5 g. tantalum pentachloride in 20 ml. of concentrated HCl.

The catalyst contained 0.36% wt. Pt, 0.22% wt. Ta and 1.5% wt. Cl.

(e) A platinum-alumina free of tantalum or niobium was prepared for comparative purposes by the same technique as (a) above except that no tantalum was added. The catalyst contained 0.39% wt. Pt, nil F and 1.3% wt. Cl.

(f) A sample of catalyst (e) was impregnated with fluoride ions by standing the pellets of (e) in a saturated solution of ammonium fluoride for 24 hours. The pellets were dried again at 120° C. and granulated and calcined as above. The catalyst contained 0.39% wt. Pt, 11.0% wt. F and 1.3% wt. Cl.

EXAMPLE 2

Use of catalysts

The catalysts (a), (b), (c) and (d) of Example 1 were used to convert n-heptane at atmospheric pressure, a hydrogen/hydrocarbon ratio of 7.2:1 and a gas hourly space velocity of 480. Runs were carried out at 50° C. intervals from 250 to 500° C. and the products from each run were analyzed by GLC.

For comparative purposes, runs were made with catalysts (e) and (f) of Example 1 and a commercial platinum alumina having 0.375% wt. Pt, nil F and 0.9% wt. Cl (catalyst (g)).

Before use each catalyst was reduced in situ in the reactor by purging with nitrogen, establishing a flow of hydrogen over the catalyst at 3000 GHSV, raising the temperature to 500° C. over a period of 1 hour and holding the temperature at 500° C. for two hours. The catalyst was allowed to cool to 250° C. while maintaining the flow of hydrogen and the feedstock was then introduced with the appropriate reduction in the hydrogen flow.

The results are shown in Table 1 below.

lyst (b) with the Pt/F/Al$_2$O$_3$ catalyst (e), again the Ta and Nb containing catalysts show a greater overall conversion activity. Clearly the fluorine is also having an effect on the individual reactions occurring as compared with the fluorine free catalysts. Nevertheless the presence of the niobium has considerably increased the isomerization activity and has altered the pattern of the hydrocracking. The tantalum containing catalyst shows an improved isomerization activity and also an improved dehydrocyclization activity.

EXAMPLE 3

The Pt/Ta/F/Al$_2$O$_3$ catalyst (a) of Example 1 was used to hydrogenate aromatics in a petroleum gasoline frac-

TABLE 1

| | Pt/Ta/F/Al$_2$O$_3$ Catalyst (a) | Pt/Nb/F/Al$_2$O$_3$ Catalyst (b) | Pt/Nb/Al$_2$O$_3$ Catalyst (c) | Pt/Ta/Al$_2$O$_3$ Catalyst (d) | Pt/Al$_2$O$_3$ Catalyst (e) | Commercial Pt/Al$_2$O$_3$ Catalyst (g) | Fluorinated Pt/Al$_2$O$_3$ Catalyst (f) |
|---|---|---|---|---|---|---|---|
| Conversion (percent mol) at— | | | | | | | |
| 300° C | 48 | 56 | 31 | 26 | 9 | 5 | 22 |
| 350° C | 90 | 87 | 45 | 57 | 32 | 7 | 36 |
| 400° C | 100 | 100 | 79 | 90 | 64 | 32 | 84 |
| 450° C | | | 95 | 100 | 90 | 75 | 92 |
| 500° C | | | 100 | | 100 | 100 | 77 |
| Conversion (percent mol) to aromatics at— | | | | | | | |
| 350° C | 23 | 1 | 9 | 10 | 8 | 0 | 0 |
| 400° C | 53 | 4 | 34 | 38 | 28 | 9 | 2 |
| 450° C | 26 | | 44 | 43 | 45 | 38 | 4 |
| 500° C | | 9 | 42 | 30 | 62 | 66 | 2 |
| Conversion (percent mol) to isomers at— | | | | | | | |
| 250° C | 11 | 11 | 0 | 0 | 0 | 0 | 0 |
| 300° C | 33 | 47 | 7 | 4 | 2 | 0 | 4 |
| 350° C | 33 | 40 | 12 | 13 | 10 | 0 | 18 |
| Conversion (percent mol) to hydrocracked products at 400° C.: | | | | | | | |
| C$_1$ + C$_2$ | 4 | 1.5 | 14 | 24 | 4 | 6 | 11 |
| C$_3$ | 17 | 39 | 4 | 3 | 3 | 1 | 23 |
| n-C$_4$ | 8 | 31 | 4 | 3 | 3 | 1 | 9 |
| iso-C$_4$ | 13 | 16 | 0.5 | 1 | 0 | 0 | 19 |
| C$_5$ + C$_6$ | 4 | 0 | 10 | 10 | 7 | 2 | 0 |

Definitions:

$$\text{'Conversion percent mol'} = \frac{\text{moles of product from reactor excluding nC}_7}{\text{moles of product from reactor including nC}_7} \times 100\%$$

$$\text{'Conversion to aromatics percent mol'} = \frac{\text{moles of aromatics product from reactor}}{\text{moles of total product including nC}_7} \times 100\%$$

$$\text{'Conversion to isomers percent mol'} = \frac{\text{moles of C}_7 \text{ isomers from reactor}}{\text{moles of total product including nC}_7} \times 100\%$$

$$\text{'Conversion to hydrocracked product percent mol'} = \frac{\text{moles of hydrocracked product}}{\text{moles of total product including nC}_7} \times 100\%$$

The runs of Table 1 lasted 20 minutes and the results quoted are based on a sample obtained at the end of the period.

Comparing first the fluorine-free catalysts, i.e. the Pt-Nb-Al$_2$O$_3$ and the Pt-Ta-Al$_2$O$_3$ catalysts (c) and (d) with the Pt-Al$_2$O$_3$ catalysts (e) and (g), it will be seen that the presence of the niobium or tantalum has increased the overall conversion activity, the Pt-Nb catalyst giving for example, 31% conversion at 300° C. and the Pt-Ta catalyst giving 26% conversion at 300° C. as compared with 9% and 5% for the Pt-Al$_2$O$_3$ catalysts. At 350-400° C. this increased conversion is partly accounted for by an improved conversion to aromatics and at 300-350° C. there is also better isomerization. The conversion to hydrocracked products at 400° C. shows that a considerable part of this improved conversion is cracking to C$_1$+C$_2$ and C$_5$+C$_6$ hydrocarbons.

Comparing the fluorine-containing catalysts i.e. the Pt/Ta/F/Al$_2$O$_3$ catalyst (a) and the Pt/Nb/F/Al$_2$O$_3$ catation having a boiling range of 54 to 178° C. and containing 11.5% wt. aromatics (the other hydrocarbons were 63.9% wt. paraffins and 24.6% wt. naphthenes) and a petroleum kerosene fraction having a boiling range of 162 to 262° C. and containing 19.3% wt. aromatics.

The sulphur contents of these feedstocks were varied by omitting or using a preliminary hydrodesulphurization to give feedstocks of varying sulphur content.

The following conditions were kept constant throughout the run:

Pressure _____ bars (ga.) __ 49.3
Space velocity _____ v./v./hr __ 1.0
H$_2$ gas rate _____ m.$^3$/m.$^3$ __ 423
H$_2$:hydrocarbon mole ratio gasoline _____ 3.5:1
H$_2$:hydrocarbon mole ratio kerosene _____ 5:1

Variables examined were temperature, sulphur content of feedstock, and H$_2$S removal from the recycle gas.

The results are shown in Table 2 below.

TABLE 2

| | Gasoline feed | Hours on stream | | | | | | | | | Kerosene feed | Hours on stream | | | |
|---|---|---|---|---|---|---|---|---|---|---|---|---|---|---|---|
| | | 10-174 | 174-330 | 386 | 624 | 840-928 | 928-977 | 928-1,096 | 1,096-1,173 | 1,173-1,295 | | 1,295-1,361 | 1,361-1,436 | 1,436-1,464 | 1,464-1,506 |
| Temperature, ° C | | 250 | 290 | 290 | 350 | 290 | 300 | 300 | 310 | 310 | | 310 | 280 | 280 | 280 |
| S content of feedstock, p.p.m. wt | | 100 | 100 | 800 | 800 | 100 | 100 | 100 | 100 | 100 | | 27 | 27 | 2,800 | 27 |
| Recycle gas scrubbing | | Yes | Yes | Yes | Yes | Yes | Yes | No | No | Yes | | Yes | Yes | Yes | Yes |
| Product: | | | | | | | | | | | | | | | |
| Total aromatics, percent wt | 11.5 | <0.1 | <0.1 | 6.3 | 1.0 | <0.1 | <0.1 | 0.5 | 0.2 | <0.1 | 19.3 | <0.1 | <0.1 | 18.9 | <0.1 |
| Benzene, p.p.m. wt | 11,000 | 120 | <10 | | | 140 | 30 | 1,000 | 600 | <10 | | | | | |
| S content,[1] p.p.m. wt | | 15 | 11 | | 13 | | | | | | | | | | |
| Yield, percent wt | | 95 | 95 | 94 | 94 | 95 | 94 | 93 | 94 | 95 | | 98 | 98 | 98 | 97 |

[1] After soda washing to remove dissolved H$_2$S.

Table 2 shows the ability of the catalyst to hydrogenate aromatics in a gasoline containing 100 p.p.m. S to a level below 0.1% wt. (benzene to below 10 p.p.m. wt.) at 290° C. 800 p.p.m. of sulphur reduced the catalyst activity; nevertheless a product of 1.0% wt. aromatics was obtained at 350° C. Omission of recycle gas scrubbing (allowing a build up to 0.0045% vol. $H_2S$ in the recycle gas) also reduced catalyst activity but again levels of as low as 0.2% wt. aromatics were obtained at 310° C. The treatment of a 800 p.p.m. S feedstock and the omission of recycle gas scrubbing did not, however, permanently deactivate the catalyst, product below 0.1% wt. aromatics (benzene below 10 p.p.m. wt.) being obtained at 310° C. on reversion to the original conditions.

Similar trends are shown with the kerosene feedstock, a temperature of 280° C. giving a product of 0.1% wt. aromatics with a 27 p.p.m. wt. sulphur feedstock. A raw feedstock with 0.28% wt. S and 20.5% wt. aromatics could not be significantly reduced in aromatics content at 280° C., but, by analogy with the results on gasoline, greater hydrogenation would have been obtained by increasing the temperature to 350° C. The final period shows that contact with this high sulphur feedstock had not deactivated the catalyst and that, after 1506 hours on stream, it was still highly active.

We claim:
1. A process for the catalytic reforming of a petroleum fraction boiling in the gasoline range comprising contacting the said petroleum fraction at a temperature of 400–550° C., a pressure of 3–35 bars (gauge), a space velocity of 0.5–5 v./v./hr. and a hydrogen:hydrocarbon mole ratio of 1:1 to 10:1 with a catalyst comprising from 0.1 to 1% by weight of platinum and 0.1 to 1% by weight of tantalum or niobium on an alumina support.
2. A process as claimed in claim 1 wherein the catalyst contains 0.1 to 2% by weight of chlorine.

References Cited
UNITED STATES PATENTS

| | | | |
|---|---|---|---|
| 2,378,209 | 6/1945 | Fuller et al. | 260—673.5 |
| 2,441,297 | 5/1948 | Stirton | 260—668 |
| 2,500,146 | 3/1950 | Fleck et al. | 260—668 |
| 3,480,684 | 11/1969 | Hansford | 260—673.5 |
| 3,415,737 | 12/1968 | Kluksdahl | 208—139 |

DELBERT E. GANTZ, Primary Examiner

S. L. BERGER, Assistant Examiner

U.S. Cl. X.R.

208—138; 252—441, 466 PT

PO-1050
(5/69)

UNITED STATES PATENT OFFICE
CERTIFICATE OF CORRECTION

Patent No. 3,799,867            Dated    March 26, 1974

Inventor(s)   Joseph Robin Cardwell and Christopher Ronald Pout

It is certified that error appears in the above-identified patent and that said Letters Patent are hereby corrected as shown below:

Column 4, line 34, "0.37%" should read --0.35%--.

Signed and sealed this 13th day of August 1974.

(SEAL)
Attest:

McCOY M. GIBSON, JR.            C. MARSHALL DANN
Attesting Officer               Commissioner of Patents